United States Patent
Kamdar et al.

(10) Patent No.: US 10,387,959 B2
(45) Date of Patent: Aug. 20, 2019

(54) PORTFOLIO-BASED DOMAIN NAME RECOMMENDATIONS

(71) Applicant: Go Daddy Operating Company, LLC, Scottsdale, AZ (US)

(72) Inventors: Tapan Kamdar, San Jose, CA (US); David A. Kellogg, Cupertino, CA (US); Wei-Cheng Lai, Cupertino, CA (US); Yu Tian, Sunnyvale, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 245 days.

(21) Appl. No.: 15/413,062

(22) Filed: Jan. 23, 2017

(65) Prior Publication Data
US 2018/0211320 A1 Jul. 26, 2018

(51) Int. Cl.
*G06F 16/332* (2019.01)
*H04L 29/12* (2006.01)
*G06Q 40/06* (2012.01)
*H04L 29/08* (2006.01)

(52) U.S. Cl.
CPC ......... *G06Q 40/06* (2013.01); *G06F 16/3322* (2019.01); *H04L 61/3025* (2013.01); *H04L 61/1511* (2013.01); *H04L 67/306* (2013.01)

(58) Field of Classification Search
CPC ............. H04L 61/3025; H04L 61/1511; H04L 29/12066; H04L 29/12641; H04L 67/306; G06F 16/3322; G06F 17/2795

USPC .......................................... 707/767; 715/273
See application file for complete search history.

(56) References Cited

U.S. PATENT DOCUMENTS

| | | | | |
|---|---|---|---|---|
| 9,684,918 B2* | 6/2017 | Kamdar | ............ | G06Q 30/0621 |
| 2002/0103820 A1* | 8/2002 | Cartmell | ............... | G06F 17/273 |
| | | | | 715/260 |
| 2008/0005070 A1* | 1/2008 | Malik | ................... | G06F 16/951 |
| 2014/0143331 A1* | 5/2014 | Smith et al. | ........ | G06F 17/2795 |
| | | | | 709/204 |
| 2015/0051996 A1* | 2/2015 | Rajesh | ............... | G06Q 30/0601 |
| | | | | 705/26.3 |
| 2015/0095374 A1* | 4/2015 | Pattapu | ............... | H04L 61/1511 |
| | | | | 707/780 |
| 2015/0347423 A1* | 12/2015 | Jheeta | ................. | G06F 16/3322 |
| | | | | 707/767 |

* cited by examiner

*Primary Examiner* — Dennis Truong
(74) *Attorney, Agent, or Firm* — Quarles & Brady LLP

(57) ABSTRACT

Methods for generating (also known as spinning) and displaying suggested domain names to a domain name registrant by a domain name registrar are presented. The methods generate and display suggested domain names based on one or more methods. The one or more methods include determining how frequently the generated domain names are displayed to the domain name registrant (the fewer the times the better), the value of the generated domain names and/or how well the generated domain names compliment a portfolio of domain names or products and services already registered to the domain name registrant.

12 Claims, 4 Drawing Sheets

PORTFOLIO-BASED DOMAIN NAME RECOMMENDATIONS

FIELD OF THE INVENTION

The present invention generally relates to the field of suggesting domain names, and more specifically to suggesting domain names based on the registrant's portfolio of already registered domain names.

SUMMARY OF THE INVENTION

The present invention provides methods for generating (also known as spinning) and displaying new domain names to a domain name registrant by a domain name registrar based on: 1) how frequently the new domain names have been displayed to the domain name registrant (the fewer the times the better) and 2) how well the new domain names compliment or are based on a portfolio of domain names and/or products and services already registered to the domain name registrant.

In an embodiment of the invention, the domain name registrar tracks and stores in a database how many times and the first time when each domain name is displayed to each domain name registrant (customer) of the domain name registrar. The domain name registrar may then use the number of times a domain name has been displayed to the domain name registrant (or the number of times over a given period) to determine whether or not to display the domain name to the domain name registrant. As a non-limiting example, threshold values, such as five times and six months, may be selected so that no domain name will be displayed to the domain name registrant more than five times if it is no longer than six months since the first time the domain name was shown. This embodiment helps to keep the displayed domain names fresh, so that the domain name registrant does not keep seeing the same domain names over and over. However, if the resulting suggestion list is empty as a result of running out of available newer domain names, those old domain names may be rotated back to display again.

In another embodiment, the domain name registrar may determine all the domain names already registered to the domain name registrant and how long each of these domain names has been registered to the domain name registrant. Applicants have noticed that domain name registrants are less likely to register new domain names based on "old" domain names (those registered a long time ago) as well as "new" domain names (those registered recently) and that domain name registrants are more likely to register new domain names for "middle-aged" domain names (those registered less than "old" domain names, but more than "new" domain names). In addition to finding "middle-aged" domain names, other methods may be used to find important domain names that are more likely to generate new domain names that will be registered. These additional methods include: finding domain names that have the latest expiration dates in portfolio, finding domain names that is subscribed by a domain name registrant, or finding the most frequently searched domain names from the domain name registrant's search history.

The domain name registrar may determine which of the domain names already registered to the domain name registrant have been registered longer than "new" domain names, but less than "old" domain names (the "middle-aged" domain names). The domain name registrar may then generate new domain names based on the "middle-aged" domain names. The time period for determining which domain names are "new" and which are "old" may be adjusted as desired. As a non-limiting example, domain names registered more than five years may be considered "old" domain names while domain names registered less than one year may be considered "new" domain names for this embodiment. As a non-limiting example, the domain name registrar may tokenize one or more "middle-aged" domain names and replace tokens with synonyms, switch the locations of the tokens and/or synonyms within an already registered domain name, move a token in a second level domain that happens to be a valid TLD to the TLD position and/or move a TLD into a second level domain and use a different TLD. This embodiment has the advantage of generating and displaying suggested domain names based off of the "middle-aged" domain names already registered to the domain name registrant where domain name registrants are more likely to want to register new domain names.

In another embodiment, the domain name registrar may determine a value for every domain name registered to the domain name registrant. The value may be, as non-limiting examples, a monetary value, such as an appraised or expected selling price of the domain name or a value based on a search engine optimization (SEO) score for the domain name. Generating and displaying domain names based off of the higher value domain names already registered to the domain name registrant has the advantage of producing domain names that are more likely to also be high value and thus more likely to be registered by the domain name registrant.

In another embodiment, the domain name registrar may generate and display suggested domain names that if registered, would increase the value of one or more other domain names already registered to the domain name registrant. This embodiment has the advantage of generating and displaying domain names that will raise the value of the domain name portfolio of the domain name registrant thus raising the chance that the domain name registrant will want to register these additional domain names that compliment and raise the value of the domain names already registered to the domain name registrant.

In another embodiment, the domain name registrar may generate and display suggested domain names that would work well with other products and/or services that are already purchased and/or used by the domain name registrant. As a non-limiting example, if the domain name registrant is using email services, a domain name in the format of first name+last name+.com may be displayed to the domain name registrant as this is a common email address format.

Various embodiments have been described above for generating and displaying domain names. Any one of these, a subcombination of these or all of these methods may be used together as desired. A scoring method may be used to assign personalized scores to suggested domain names for different domain registrants. A ranking engine may then rank the generated domain names from the one or more described methods for generating domain names to determine an order of the domain names to suggest to the domain name registrant on a website displayed on a client device. In some embodiments, the lower ranked domain names are not displayed to the domain name registrant at all.

In some embodiments, a reason to register the domain name may be displayed next to the generated and displayed domain name. As non-limiting examples, a label of "raises SEO scores," "raised portfolio value" or "good for email accounts" may be displayed next to a domain name that would raise SEO scores, raise the registrant's portfolio value or that is good for an email account.

In another embodiment, a label indicating the domain name registrant is not interested in a domain name may be displayed next to the domain name. This allows the domain name registrant to select the label so that that same domain name is not displayed to the domain name registrar in the future.

The domain name registrar may then select one or more domain names generated by the one or more methods of generating and displaying domain names for domain name registration. The domain name registrar may then register the selected domain names to the domain name registrant and allow the domain name registrant to control the domain names from a registrant account.

The above features and advantages of the present invention will be better understood from the following detailed description taken in conjunction with the accompanying drawings.

DETAILED DESCRIPTION

Figure 1:
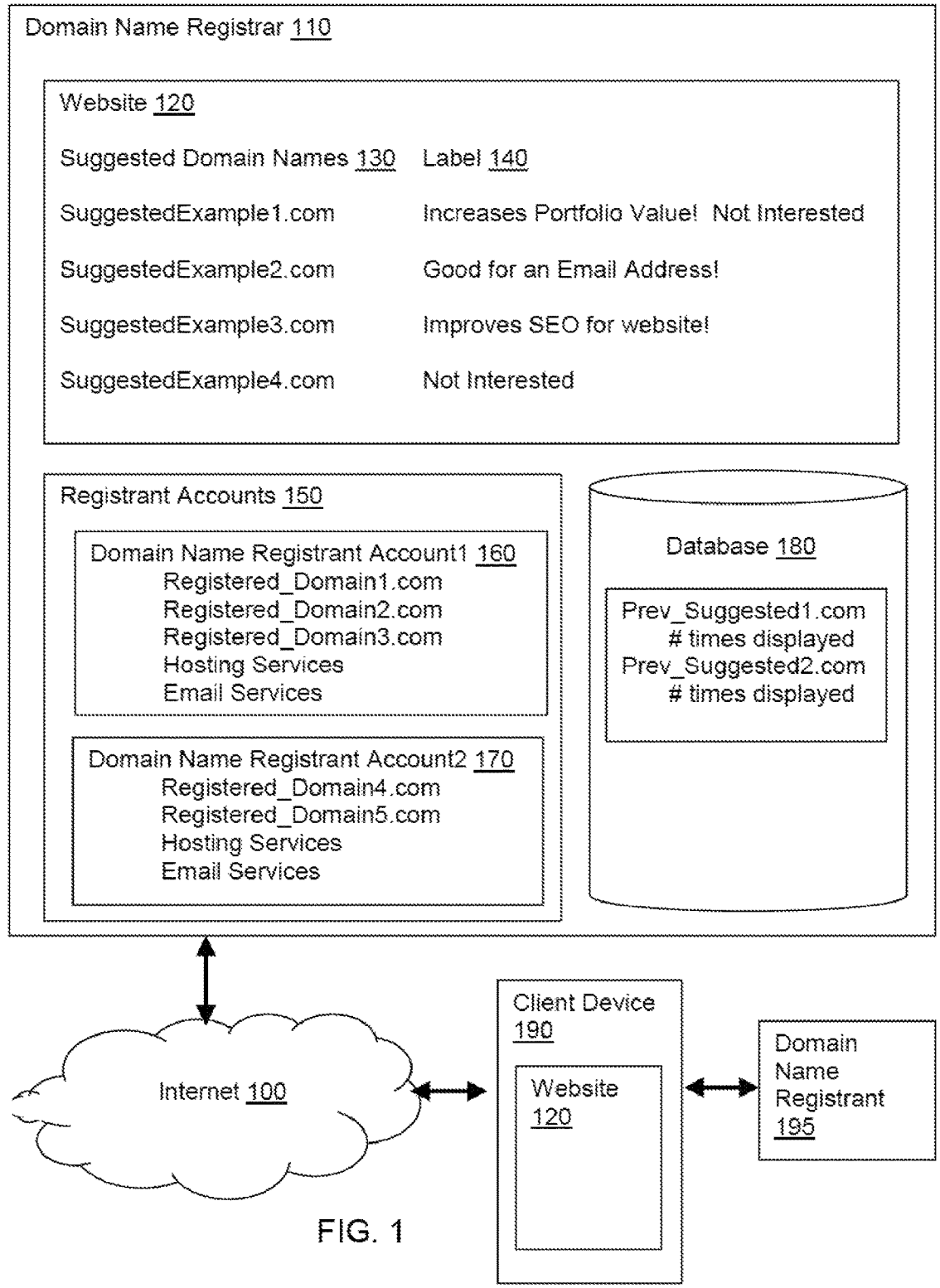
FIG. 1 is a block diagram of a system comprising a domain name registrar, the Internet, a client device and a domain name registrant that may be used to practice the present invention.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

FIG. 1 is a block diagram of a system that may be used to practice the present invention. A computer network is a collection of links and nodes (e.g., multiple computers and/or other client devices 190 connected together) arranged so that information may be passed from one part of the computer network to another over multiple links and through various nodes. Examples of computer networks include the Internet 100, the public switched telephone network, the global Telex network, computer networks (e.g., an intranet, an extranet, a local-area network, or a wide-area network), wired networks, and wireless networks.

The Internet 100 is a worldwide network of computers and computer networks arranged to allow the easy and robust exchange of information between computer users on client devices 190. Hundreds of millions of people around the world have access to client devices 190 connected to the Internet 100 via Internet Service Providers (ISPs). Content providers place multimedia information (e.g., text, graphics, audio, video, animation, and other forms of data) at specific locations on the Internet 100 referred to as websites. The combination of all the websites and their corresponding web pages on the Internet 100 is generally known as the World Wide Web (WWW) or simply the Web.

For Internet users and businesses alike, the Internet 100 continues to be increasingly valuable. More people use the Web for everyday tasks, from social networking, shopping, banking, and paying bills to consuming media and entertainment. E-commerce is growing, with businesses delivering more services and content across the Internet 100, communicating and collaborating online, and inventing new ways to connect with each other.

Prevalent on the Internet 100 are multimedia websites, some of which may offer and sell goods and services to individuals and organizations. Websites may consist of a single webpage, but typically consist of multiple interconnected and related webpages. Websites, unless very large and complex or have unusual traffic demands, typically reside on a single server and are prepared and maintained by a single individual or entity (although websites residing on multiple servers is certainly possible). Menus, links, tabs, etc. may be used to move between different web pages within the website or to move to a different website.

Websites may be created using HyperText Markup Language (HTML) to generate a standard set of tags that define how the webpages for the website are to be displayed. Users of the Internet 100 may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user on the client device 190. The user may then view other webpages at the same website or move to an entirely different website using the browser.

Some Internet users, typically those that are larger and more sophisticated, may provide their own hardware, software, and connections to the Internet 100. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet 100. A single hosting provider may literally host thousands of websites on one or more hosting servers.

Browsers are able to locate specific websites because each website, resource, and computer on the Internet 100 has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet 100. A browser is able to access a website on the Internet 100 through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar 110 is the authoritative source for the contact information related to the domain name. Such registries are referred to as "thin" registries. Most domain names having a gTLDs are organized through a Shared Registration System (SRS) based on their TLD.

A domain name registrant 195 is hereby defined to be a person or entity that is in the process of registering a domain name or has already registered a domain name. The domain name registrant 195 may use a client device 190, such as, as non-limiting examples, a cell phone, PDA, tablet, laptop computer, or desktop computer to access a website (such as a website 120 of a domain name registrar 110) via a computer network, such as the Internet 100.

The process for registering a domain name with .com, .net, .org, and some other TLDs allows a domain name registrant 195 to use an ICANN-accredited domain name registrar 110 to register their domain name. If a domain name registrant 195, for example John Doe, wishes to register the domain name "mycompany.com," John Doe may initially determine whether the desired domain name is available by contacting a domain name registrar 110.

The domain name registrar 110 may have a website 120 having a plurality of webpages. The website 120 is hosted or operated from a server. The server may be, as a non-limiting example, one or more Dell PowerEdge(s) © rack server(s) although other types of servers or combinations of one or more servers may be used. The webpages may have one or more display fields as well as one or more data entry fields. The data entry fields allow the domain name registrant 195 to enter data into the website 120 from a client device 190.

The domain name registrant 195 may contact the domain name registrar 110 using the website 120 of the domain name registrar 110 and typing the desired domain name into a field on the website 120 created for this purpose. Upon receiving the request from the domain name registrant 195, the domain name registrar 110 may ascertain whether "mycompany.com" has already been registered by, as a non-limiting example, checking with the Registry associated with the TLD for the domain name. The results of the search may be displayed on the website 120 to thereby notify the potential domain name registrant 195 of the availability of the domain name. If the domain name is available, the domain name registrant 195 may proceed with the registration process. If the domain name is not available for registration, the domain name registrant 195 may keep selecting alternative domain names until an available domain name is found.

A current problem many domain name registrants face is trying to find a domain name that is available. It is generally desirable to have a domain name that is a short word or phrase. These domain names are easier to remember and enter into a browser, thereby increasing the traffic to its associated website. Unfortunately, many people want the same short generic domain names making it difficult for new domain name registrants to find a good domain name that is not already registered. The present invention addresses the problem of finding a good available domain name.

A domain name registrant 195 may create a domain name account with a domain name registrar 110. As the domain name registrar 110 will have a plurality of customers, i.e., domain name registrants, the domain name registrar 110 will manage a plurality of registrant accounts 150. Each registrant account 160, 170 is protected, such as, as non-limiting examples, by requiring a user name and a password and/or a biometric from the domain name registrant 195. The domain name account will hold the information of all of the domain names registered to the domain name registrant 195 with the domain name registrar 110 (the domain name registrant 195 may have domain names with other domain name registrars) and the other products and services the domain name registrant 195 has with the domain name registrar 110. As non-limiting examples, a registrant account 160, 170 may list one or more domain names registered to the account holder (domain name registrant 195), one or more website hosting services of the domain name registrant 195 and one or more email accounts of the domain name registrant 195. The domain name registrar 110 has access to the registrant account 160, 170 of the domain name registrant 195 and thus knows what domain names and what products and services are registered to and used by the domain name registrant 195.

The domain name registrar 110 may also comprise a database 180. The database 180 is defined to be an electrical and/or mechanical device operating in combination with a hardware server. The invention may use one or more virtual databases running on one or more virtual servers in the cloud, but the software, virtual databases and virtual servers run on actual computer hardware. The database 180 may be a central or a distributed database or any other type of desired database.

In preferred embodiments, the database 180 stores data regarding the domain name registrants that are customers of the domain name registrar 110, such as, as non-limiting examples, which domain names have been displayed to each domain name registrant 195 (customer), how many times each domain name has been displayed to each domain name registrant 195, when each domain name was displayed to each domain name registrant 195 and/or which domain names have been purposefully rejected (as compared to just ignored) by each domain name registrant 195.

Figure 2:
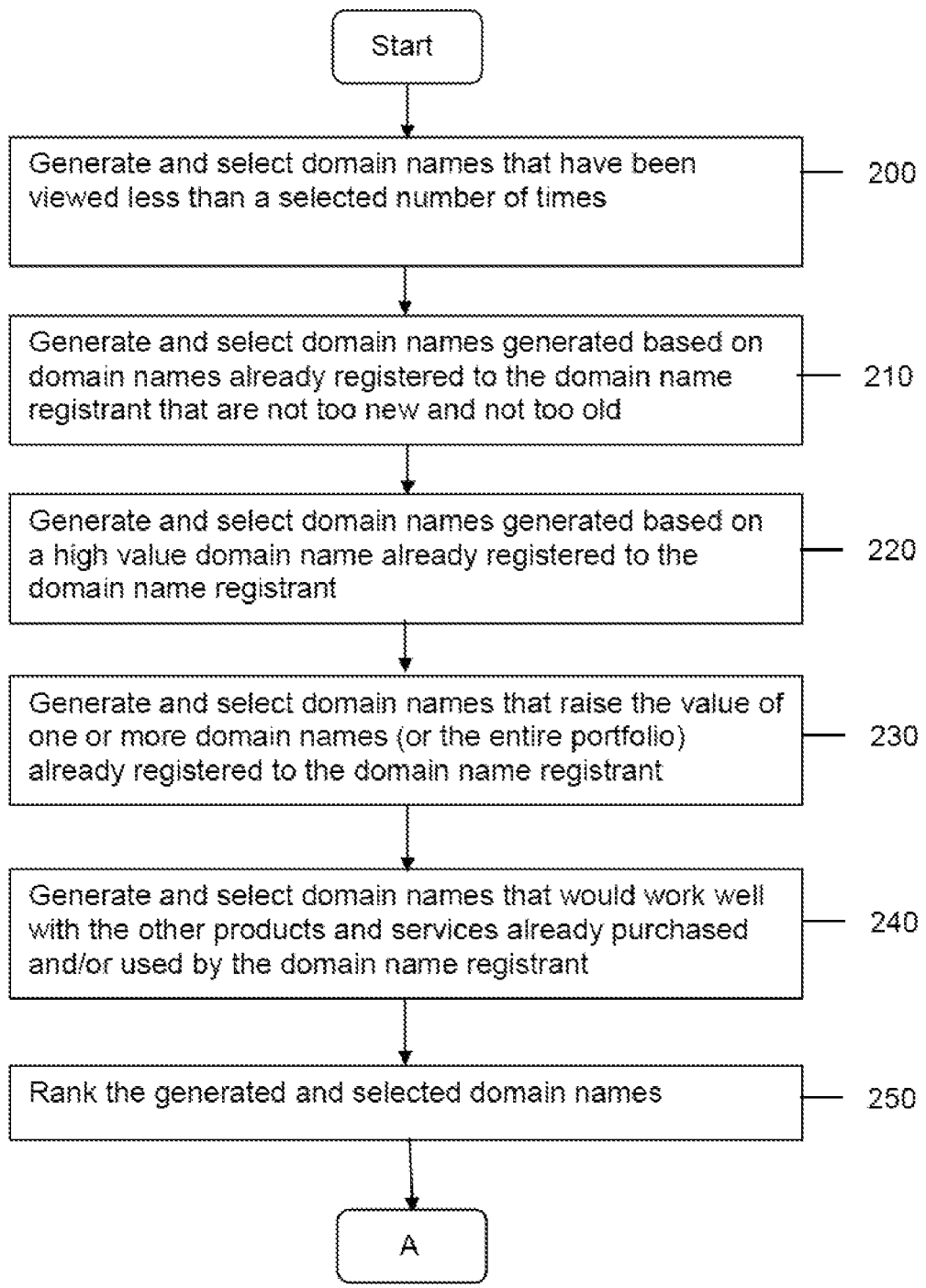
FIGS. 2 and 3 are a flow diagram illustrating an example embodiment of a method for suggesting domain names.
Figure 3:
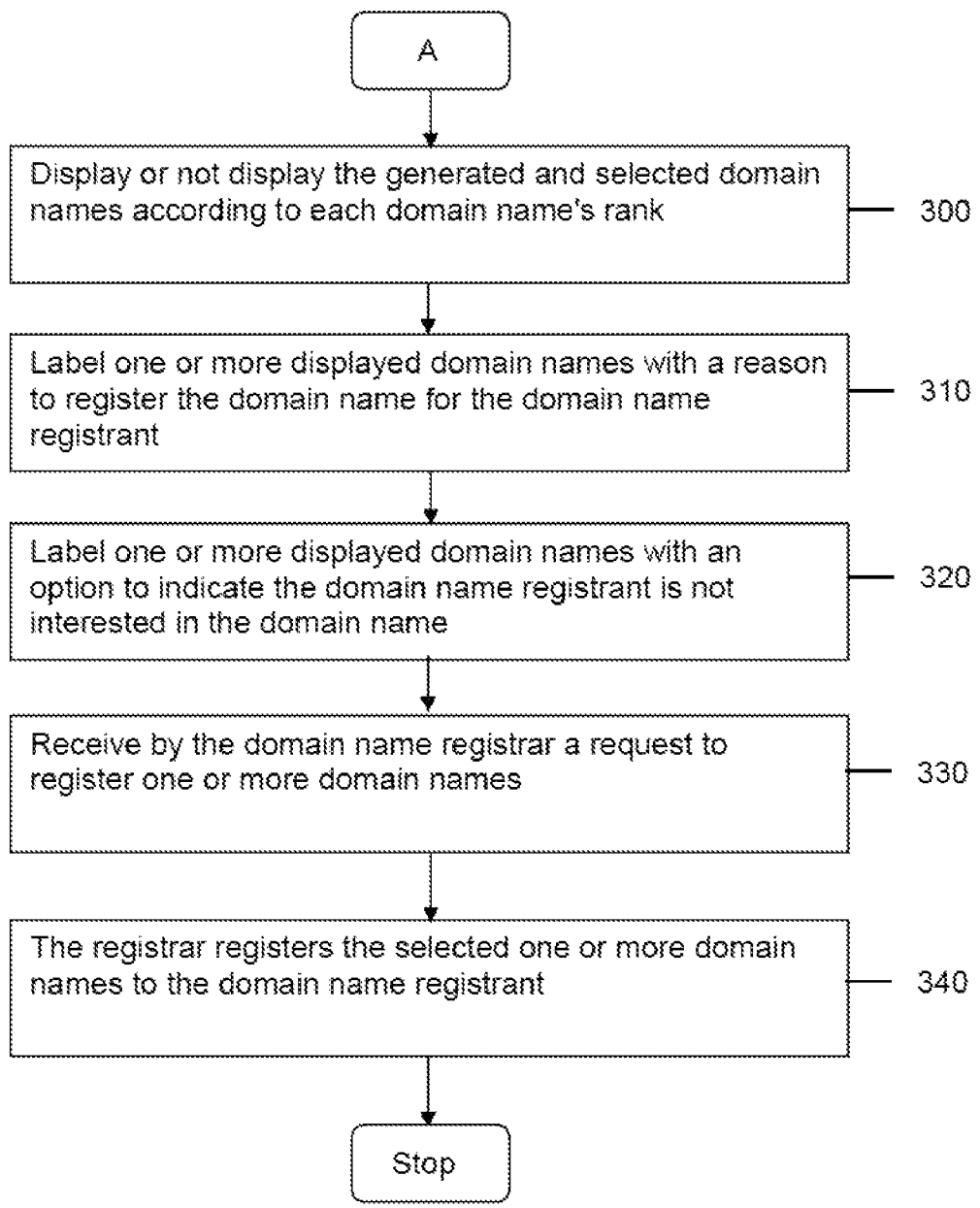

An exemplary process for practicing the invention is illustrated in FIGS. 2 and 3.

Suggesting Rarely Displayed Domain Names

In an embodiment of the invention, a history of domain names that have been displayed to a domain name registrant 195 may be stored in a database 180. The database 180 may be updated every time a new domain name or a repeat domain name is displayed to the domain name registrant 195 so that a record of domain names and how many times each domain name has been displayed to the domain name registrant 195 may be tracked and stored in the database 180. By reading from the database 180, the domain name registrar 110 may determine which domain names, when and how many times each domain name has been displayed/suggested to the domain name registrant 195.

When a plurality of domain names have been generated as possible domain names to suggest and display to the domain name registrant 195, the domain name registrar 110 may, by reading the database 180, determine if any if the generated domain names have already been displayed to the domain name registrant 195 and, if so, how many times and since when it was first displayed. A value may be selected such that any domain name already displayed or suggested to the domain name registrant 195 over the selected value number of times within the specified time period, may be discarded or removed from the plurality of generated domain names so that the discarded or removed domain names are not again displayed and suggested to the domain name registrant 195. In this manner, the domain name registrar 110 will not keep displaying and suggesting domain names to the domain name registrant 195 that have already been seen and ignored by the domain name registrant 195. (Step 200)

As an example, a domain name "prev_suggested1.com" may have been displayed to a domain name registrant 195 once and a domain name "prev_suggested2.com" may have been displayed to the domain name registrant 195 five times. If a value of five is selected as a threshold number (so that the same domain name is not suggested to a domain name registrant 195 more than five times) the domain name "prev_suggested1.com" may be displayed to the domain name registrant 195 (one showing is less than the selected value of 5) while the domain name "prev_suggested2.com" is not displayed again to the domain name registrant 195 (five showings is equal to the maximum number of showings allowed). This has the advantage of displaying fresher domain names 130 and not continually showing the same domain names that have already been shown, but not selected by the domain name registrant 195.

In the previous embodiment, the selected value was a number of times the domain name was ever displayed to the domain name registrant 195. In a variation, the domain name registrar 110 may determine how many times a domain name was displayed to the domain name registrant 195 within a given time period. As an example, a domain name that is displayed to the domain name registrant 195 more than five times within the last 30 days may be removed or purposefully not displayed to the domain name registrant 195. While this example used five times and 30 days as the time period, these numbers may be adjusted as desired. The time period makes sure those disabled domain names will still have a chance to be displayed in the future in case a change of purchase intention happened to the domain name registrant.

As another variation, the domain name registrar 110 may use the number of times the domain name was displayed or the number of times the domain name was displayed over a period of time and use that number in ranking the generated domain names. In this variation, a domain name that has been displayed often and/or recently to the domain name registrant 195 will be displayed lower in a list of suggested domain names 130 than domain names that have been displayed fewer times and/or less recently. This method has the advantage of displaying newer and fresher domain names 130 to the domain name registrant 195 instead of domain names that have already been seen and ignored by the domain name registrant 195.

As an action of starvation protection, if no more fresher domain names are available to be shown, the domain names that have already been displayed many times will be randomly shuffled to be redisplayed to the domain name registrant.

Domain Names Based on a Middle-Aged Registered Domain Name

In another embodiment, a domain name registrar 110 may determine one or more domain names that have been registered to a domain name registrant 195. This may be done be reading the registered domain names in a registrant account 160, 170 of the domain name registrant 195. As an example, the domain name registrar 110 may determine that the domain name registrant 195 is associated with a registrant account "Domain Name Registrant Account1" 160 and that the domain name registrant 195 has already registered the domain names "Registered_Domain1.com," "Registered_Domain2.com" and "Registered_Domain3.com." The domain name registrar 110 may also determine, by reading the account information, when each of these domain names was registered. In some embodiments, the domain name registrar 110 may also search other databases, such as zone files and/or WHOIS records, to find additional domain names and that may be registered to the domain name registrant 195 and their dates of registration.

The domain name registrar 110 may divide the domain names registered to the domain name registrant 195 into three groups, a young registration, an old registration and a middle-aged registration. The young registration domain names may be determined as those domain names that have been registered less than a determined first time period, such as, as a non-limiting example, one year. The old registration domain names may be determined as those domain names that have been registered more than a determined second time period, such as, as a non-limiting example, ten years. The middle-aged registration may be those domain names that have been registered longer than one year, but less than 10 years.

Applicants have discovered that generating new domain names based on very new or very old domain names are less likely to be selected than domain names based on middle-aged domain names. To take advantage of this, the domain name registrar 110 may ignore the young and the old domain names and generate a plurality of new domain names 130 based on a middle-aged domain name registered to the domain name registrant 195. As a non-limiting example, the domain name registrar 110 may tokenize the middle-aged domain name and create new domain names 130 by rearranging the tokens, inserting synonyms for the tokens and/or trying new TLDs with the tokens. These generated domain names 130 based on a middle-aged domain name already registered to the domain name registrant 195 may then be displayed to the domain name registrant 195 for registration. (Step 210)

Since spinning on personal names may end up generating an offensive domain name, it's a risky move to apply general spins on domain names that contain the domain name registrant's name in it. Therefore before applying any spinning methods the system may distinguish if a domain name contains a personal name by checking the domain name registrant's portfolio. If a personal name is contained in a generated domain name, a special spin type may be applied, specifically the name part may be replaced using other forms of the registrant's name. As a non-limiting example, John Doe has a domain name "johnsite.com" his first name in this domain name may be replaced by his last name, so a doname name "doesite.com" will be recommended to him.

Domain Names Based on a High Value Domain Name

In another embodiment, a domain name registrar 110 may determine all of the domain names registered to a domain name registrant 195 as previously discussed. The domain name registrar 110 may then determine a value for one or more of the domain names.

The value may be a monetary estimate of the value of the domain name, such as an expected sales price or an average sales price of similar domain names. This may be determined by creating a database of recently sold domain names and averaging the sales prices of the recently sold domain names closest to the domain name. (Step 220)

The value may be based on the number of products and services the domain name registrant 195 is using with each domain name. The domain name registrar 110 may read from a registrant account 160, 170 of the domain name registrar 110 and determine how many products or services are connected to each domain name registered to the domain name registrant 195. (Step 240)

The value may be based on an estimated search engine optimization (SEO) score and/or an estimated traffic that may be generated based on the domain name. The higher the SEO score and/or the more expected traffic, the higher the value of the domain name. This may be based on the past history of the domain name or based on the past experience of similar domain names.

The value may be determined by the domain names registrant's personal preference based on his past purchase and search behavior. Collaborative Filtering methods may be applied to identify what the domain name registrant would be interested in and give personalized recommendation—personalized scores may be given to spin types which indicate which domain names are more attractive to the domain name registrant; more attractive domain names will therefore have more chances to be ranked higher.

The value may be based on whether the domain name is likely to increase a value of one or more other domain names (or the entire portfolio) already registered to the domain name registrant 195. As an example, if the domain name registrant 195 owns the domain names of "Example.com" and "Example.net," the domain name registrant 195 may want to get the domain name "Example.org" to help complete the set. As another example, a domain name registrant 195 may desire to register a common misspelling of a domain name already registered to the domain name registrant 195 as owning both TLDs (what a company would want and pay for) is more valuable than owning the domain names separately (a company would likely pay less for a domain name where a common misspelling of the domain name was owned and/or used by a third party). (Step 230)

The value may be based on how well a given domain name will work with products either already purchased or offered by the domain name registrar 110. As an example, a domain name in the format of "firstname.lastname.com" is common as an email address and thus may be assigned a higher value for this reason.

The domain name registrar 110 may use one or more of the previously described methods for determining a value for the domain names already registered to the domain name registrant 195. The domain name registrar 110 may then select the highest or one of the higher value domain names to use to generate additional domain names. The domain name registrar 110, as non-limiting examples, may tokenize the high value domain name(s) into a plurality of one or more words, terms and/or idioms. The domain name registrar 110 may then generate new domain names by, as non-limiting examples, reordering the tokens, replacing one or more tokens with synonyms, using different TLDs, moving TLDs in the second level domain to the TLD and/or moving the TLD into the second level domain and using a different TLD.

The domain name registrar 110 may then select and display the new domain names 130 generated and based on the highest value domain names already registered to the domain name registrant 195 while not using the lower value domain names already register to the domain name registrant 195 to generate domain names.

In a variation, the domain name registrar 110 may rank higher (and thus display before or with more emphasis) generated domain names based on already registered domain names having a high value and rank lower (and thus display after or with less emphasis) generated domain names based on already registered domain names having a lower value.

Display the Generated and Selected Domain Names

The domain name registrar 110 may use any combination (or all of the methods) of generating, selecting and ranking a plurality of domain names previously described. (Step 250) A scoring method may give initial scores to suggested domain names based on personalized features of the domain name registrant. A ranking engine may then rank the generated domain names from the one or more described methods for generating domain names to determine an order of the domain names to suggest to the domain name registrant on the website 120 displayed on the client device 190. In some embodiments, the lower ranked domain names are not displayed to the domain name registrant at all. (Step 300) The domain name registrar 110 may then display the plurality of generated and selected domain names 130 on a website 120 displayed on a client device 190 being used by a domain name registrant 195.

In another embodiment, a label 140 identifying why a domain name is particularly valuable may be displayed next to the domain name. A label 140 may be displayed next to the domain name indicating the domain name, as non-limiting examples, increase a portfolio value of the domain name registrant 195, is good for an email address or has a high SEO value. These labels 140 may help the domain name registrant 195 identify valuable domain names 130 and help the domain name registrant 195 understand how to use the labeled domain names 130. (Step 310)

In another embodiment, a label 140 may be displayed near a domain name that if the label 140 is selected by the domain name registrant 195, would let the domain name registrar 110 know that the domain name registrant 195 is not interested in that domain name. In this case this information (the domain name and desire of the domain name registrant 195 not to see the domain name again) may be stored in the database 180 and the domain name will not be displayed to the domain name registrant 195 by the domain name registrar 110 in the future. (Step 320)

Receive a Request to Register One or More Domain Names

The domain name registrar 110 may receive a request from the domain name registrant 195 to register one or more of the suggested and displayed domain name on the client device 190 of the domain name registrant 195. (Step 330)

The domain name registrar 110 may then collect the domain name registration fee and register the domain name(s) to the domain name registrant 195. The domain name registrar 110 will place the registered domain name(s) in a registrant account 160, 170 for the domain name registrant 195 so that the domain name registrant 195 may control the domain name, such as by using the domain name(s) to point to a website of the domain name registrant 195 or by using the domain name(s) for one or more email accounts. (Step 340)

Merchandising API Recommendation Flow

Figure 4:
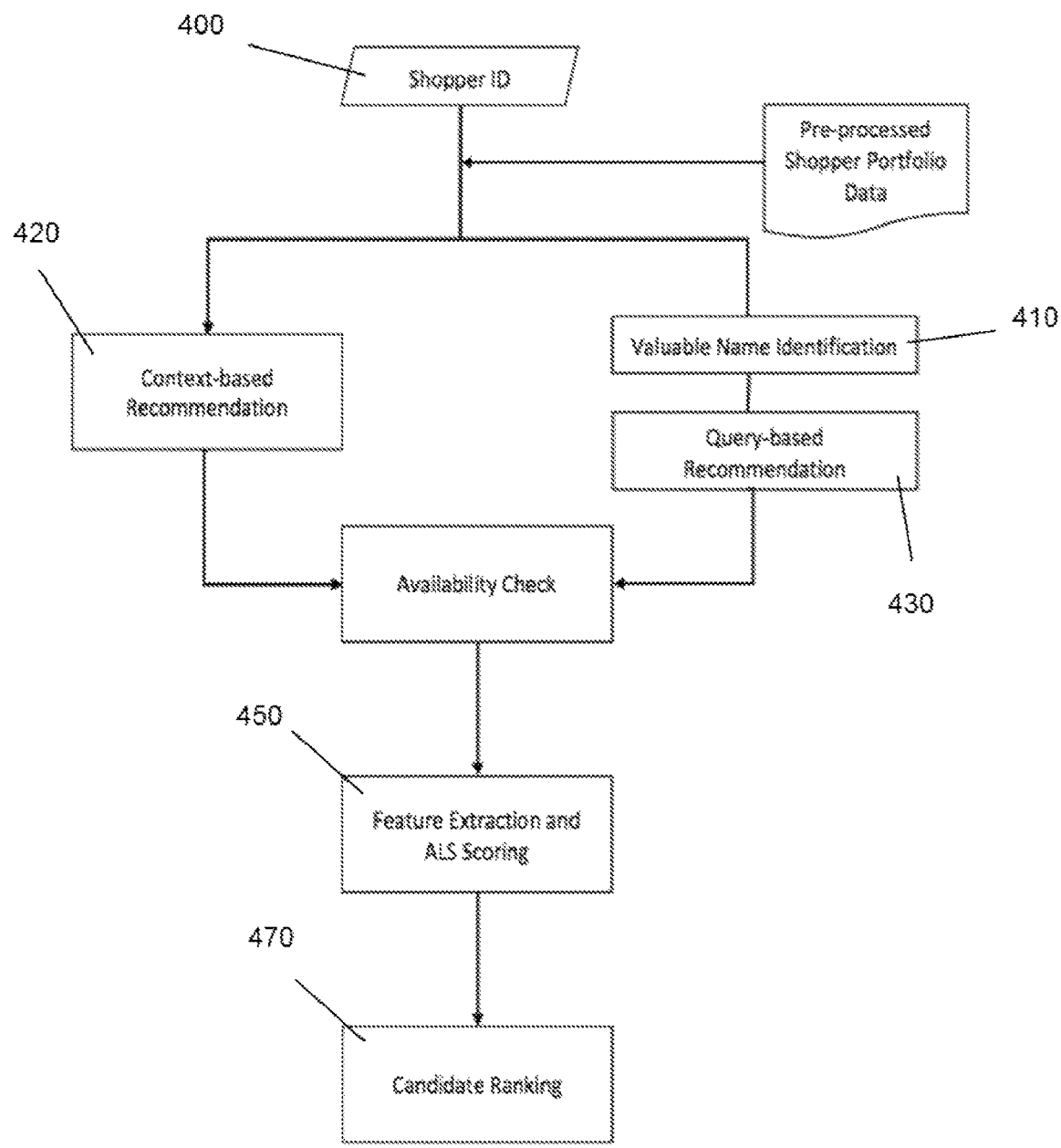
FIG. 4 is a merchandising Application Programming Interface (API) recommendation flow.

Referring to FIG. 4, a domain name registrar 110 may include a merchandising Application Programming Interface (API). The merchandising API may take a shopper id as an input. (Step 400) The merchandising API may collect personal recommendations from both context-based and query-based sources.

Context-based recommendation: The inputs to this module may be the shopper domain portfolio, past query history, and shopper profile contains his/her personal names, business name, phone number, and address. The goal of this module is to provide suggestions by composing name suggestions from different data sources. For most cases, these name suggestions could not be produced by query-based recommendation engine. Some example name patterns that may be use will now be discussed below.

Name compaction: this pattern may be triggered if the very last token of a domain name is a valid gTLD. For example, if the domain name is pizzashop.com, the last token of SLD (e.g., shop) is also a valid gTLD. The system may compact the name to "pizza.shop".

Reverse name compaction: on the other hand, if a domain name is in gTLD where gTLD is more vertical facing such as .pizza, .shop, or .car, we can create a .com domain name where the gTLD may be moved to be part of the SLD. For example, for the domain name "bike.repair" which is a gTLD name, the engine may perform a reverse compaction and suggest the domain name "bikerepair.com".

Business detection: the industry the shoppers is in may be detected using a machine-learning model. Given the context data, the model can detect the industry the business is in. The model may be trained using millions of labeled data against NAICS (North American Industry Classification System) ontology. The model may be able to track the relevancy of any given word with respect to any industry in NAICS. Note that some shoppers could be in several industries. For these cases, the system may report all of the industries together with the set of keywords best describing their industries. With these business keywords, the system may generate suggestions that are business-facing. For example, for shoppers in the real estate industry located at Las Vegas, the engine may generate domain names such as house.lasvegas, realtorlasvegas.com, navadahouse.com, . . . etc.

Personal name domains: the engine may learn the shopper's first name, middle name, and last name from the shopper's profile data. The engine may also know the shopper's main business with a business detection module. The engine may suggest personal name domains such as first_name.com, last_name.com, first_name last_name.com, last_name+business.com, . . . etc. For example, suppose a shopper with the name John Smith is from New York City and the most frequent used words in his portfolio and query history is law, the engine may suggest domain names such as john.com, smith.com, johnsmith.com, johnlaw.com, smithlaw.com, smithlaw.nyc. john.nyc, johnsmithnyc.com, . . . etc. For the suggestion results, the availability of the candidate domain names may be determined and the available domain names may be ranked by, as non-limiting examples, price, TLD popularity, relevancy to the business of the shopper/domain name registrant.

Context-based recommendation candidates are domain names generated from domain names currently registered to the domain name registrant or from past queries received from the domain name registrant. (Step 420)

Query-based recommendation candidates are domain names generated from high value domain names and past queries identified through offline data mining. The value may be determined based on different metrics discussed earlier, for example: subscribed domain names, latest expiring domain names, or most recent frequent search queries. (Steps 410, 430)

Valuable name identification: given the shopper's portfolio data, past name query history, and add to cart activity, this module may identify a small set of domain names and/or queries that represent a high value for this particular shopper. This set of domain names may be used as domain name queries to the query-based search engine. The query-based search engine may respond with domain name spins by adding term(s), dropping term(s) and/or replacing term(s) to the query. Usually, shoppers purchased these highly similar domain names to protect the shopper's name brands. High value names may be identified as the middle-age domain names, the domain names with high traffic and/or domain names with high resale value.

Query-based recommend: The domain name search engine may be offered by a domain name registrar. Given a name query, the engine within the domain name registrar may tokenize the query, determine the shopper's geo location and create ccTLD spins, create SLD spins by term addition/drop/replacement, identify relevant TLDs, assemble SLD spins with relevant TLDs to form domain name candidates, and rank the domain name candidates with respect to relevancy, price, and TLD popularity.

After the recommendation candidates are generated, a scoring method may be applied to give initial scores to the suggested domain names. The merchandising API may use one or more user/product vectors learned from an Alternating Least Squares (ALS) model to get an initial candidate score for each generated domain name. (Step 450) A domain name ranker may then rank the scored generated domain names.

This embodiment may also include generating personalized candidate scores (collaborative filtering). Matrix factorization may be based on a collaborative filtering model, such as ALS, that factorizes shoppers and suggests types into vector representations according to past their and their peers' past behaviors. Domain names suggested to a specific shopper (domain name registrant 195) may be given a unique and personalized score.

A ranking function for the suggested domain names may be part of the domain name registrar 110. The ranking function may scale an initial candidate score according to the length of an SLD, a type of TLD and/or a popularity of the TLD's in a domain name registrant's domain name portfolio. An embedding blending function may be used to diversify the results by categorizing domain name candidates into groups and popping ranked domain name from each group in a round-robin fashion. so that the suggested domain names will not be clustered by suggestion type. (Step 470)

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising the steps of:
   displaying on a website, comprising a plurality of webpages, by a domain name registrar a first plurality of available domain names for domain name registration to a client device configured to be viewed by a domain name registrant;
   tracking and storing in a database by the domain name registrar a number of times each domain name in the first plurality of available domain names has been displayed on the website to the domain name registrant for domain name registration;
   generating by the domain name registrar a second plurality of available domain names;
   determining by the domain name registrar a first one or more domain names in the second plurality of available domain names that have been displayed on the website to the domain name registrant for domain name registration less than a selected number of times;
   determining by the domain name registrar a second one or more domain names in the second plurality of available domain names that have been displayed on the website to the domain name registrant for domain name registration greater than the selected number of times; and
   displaying on the website by the domain name registrar to the domain name registrant the first one or more domain names that have been displayed on the website to the domain name registrant less than the selected number of times for domain name registration while simultaneously not displaying on the website by the domain name registrar the second one or more domain names that have been displayed on the website to the domain name registrant greater than the selected number of times for domain name registration.

2. The method of claim 1, further comprising the steps of:
   displaying a button, in close proximity to a first domain name in the first one or more domain names, on the website labeled to indicate the domain name registrant is not interested in the first domain name; and
   upon detecting the domain name registrant has selected the button, removing the first domain name from a future group of domain names prior to being displayed to the domain name registrant by the domain name registrar.

3. The method of claim 1, further comprising the steps of:
   determining by the domain name registrar a search engine optimization value for each domain name in the first one or more domain names to be displayed to the domain name registrant, wherein each search engine optimization value reflects an ability for each domain name to affect a visibility of a website pointed to by the domain name for one or more search engines;
   displaying a label in close proximity to a first domain name in the first one or more domain names indicating that the first domain name has a good search engine optimization value, wherein the good search engine optimization value is defined as a search engine optimization value over a selected threshold value; and
   upon detecting the domain name registrant has selected the first domain name, registering by the domain name registrar the first domain name to the domain name registrant.

4. The method of claim 1, further comprising the step of:
   determining by the domain name registrar an email value for each domain name in the first one or more domain names to be displayed to the domain name registrant, wherein the email value reflects how often a format of the domain name is used for receiving email;
   displaying a label in close proximity to a first domain name in the first one or more domain names indicating that the first domain name has a good email value, wherein the good email value is defined as an email value over a selected threshold value; and
   upon detecting the domain name registrant has selected the first domain name, registering by the domain name registrar the first domain name to the domain name registrant.

5. The method of claim 1, further comprising the steps of:
   determining by the domain name registrar for each domain name in the first one or more domain names to be displayed to the domain name registrant whether registering the domain name would increase an estimated value of one or more domain names already registered to the domain name registrant;
   displaying a label in close proximity to a first domain name in the first one or more domain names indicating registering the first domain name would increase the estimated value of the one or more domain names already registered to the domain name registrant; and
   upon detecting the domain name registrant has selected the first domain name, registering by the domain name registrar the first domain name to the domain name registrant.

6. The method of claim 1, wherein the generating by the domain name registrar the second plurality of available domain names comprises the steps of:
   determining by the domain name registrar one or more domain names already registered to the domain name registrant; and
   generating by the domain name registrar a domain name that increases a value of the one or more domain names already registered to the domain name registrant, wherein the first one or more domain names displayed to the domain name registrant comprise the domain name.

7. A method, comprising the steps of:
   reading by a domain name registrar a first plurality of domain names registered to a domain name registrant from an account of the domain name registrant with the domain name registrar;
   determining by the domain name registrar a first one or more domain names in the first plurality of domain names registered to the domain name registrant that have been registered to the domain name registrant less than a first determined time period;
   determining by the domain name registrar a second one or more domain names in the first plurality of domain names registered to the domain name registrant that have been registered to the domain name registrant greater than a second determined time period;
   determining by the domain name registrar a third one or more domain names in the first plurality of domain names registered to the domain name registrant that have been registered to the domain name registrant greater than the first determined time period and less than the second determined time period;
   generating by the domain name registrar a second plurality of domain names using words and/or terms from the third one or more domain names that have been registered to the domain name registrant greater than the first determined time period and less than the second determined time period; and displaying by the domain name registrar on a website, comprising a plurality of webpages, to the domain name registrant the second plurality of domain names for domain name registration while simultaneously not displaying a domain name generated from words or terms from the first one or more domain names that have been registered to the domain name registrant less than the first determined time period and not displaying a domain name generated from words or terms from the second one or more domain names that have been registered to the domain name registrant greater than the second determined time period.

8. The method of claim 7, further comprising the steps of:

displaying a button, in close proximity to a first domain name in the second plurality of domain names, on the website labeled to indicate the domain name registrant is not interested in the first domain name; and upon detecting the domain name registrant has selected the button, removing the first domain name from a future group of domain names prior to being displayed to the domain name registrant by the domain name registrar.

9. The method of claim 7, further comprising the steps of:

determining by the domain name registrar a search engine optimization value for each domain name in the second plurality of domain names to be displayed to the domain name registrant, wherein each search engine optimization value reflects an ability for each domain name to affect a visibility of a website pointed to by the domain name for one or more search engines;

displaying a label in close proximity to a first domain name in the second plurality of domain names indicating that the first domain name has a good search engine optimization value, wherein the good search engine optimization value is defined as a search engine optimization value over a selected threshold value; and upon detecting the domain name registrant has selected the first domain name, registering by the domain name registrar the first domain name to the domain name registrant.

10. The method of claim 7, further comprising the step of:

determining by the domain name registrar an email value for each domain name in the second plurality of domain names to be displayed to the domain name registrant, wherein each email value reflects how often a format of each domain name is used for receiving email;

displaying a label in close proximity to a first domain name in the second plurality of domain names indicating that the first domain name has a good email value, wherein the good email value is defined as an email value over a selected threshold value; and upon detecting the domain name registrant has selected the first domain name, registering by the domain name registrar the first domain name to the domain name registrant.

11. The method of claim 7, further comprising the steps of:

determining by the domain name registrar for each domain name in the second plurality of domain names to be displayed to the domain name registrant whether registering the domain name would increase an estimated value of one or more domain names already registered to the domain name registrant;

displaying a label in close proximity to a first domain name in the second plurality of domain names indicating registering the first domain name would increase the estimated value of the one or more domain names already registered to the domain name registrant; and upon detecting the domain name registrant has selected the first domain name, registering by the domain name registrar the first domain name to the domain name registrant.

12. The method of claim 7, wherein the generating by the domain name registrar the second plurality of available domain names comprises the steps of:

determining by the domain name registrar one or more domain names already registered to the domain name registrant; and generating by the domain name registrar a domain name that increases a value of the one or more domain names already registered to the domain name registrant, wherein the second plurality of domain names displayed to the domain name registrant comprises the domain name.

* * * * *